United States Patent [19]

Sato et al.

[11] 4,208,686
[45] Jun. 17, 1980

[54] TAPE RECORDER WITH MEANS FOR DISPLAYING A TIME BY NORMAL AND STOPWATCH MODES

[75] Inventors: Masanobu Sato; Ken Satoh; Toshihiro Nakao; Kenzi Furuta, all of Hachioji, Japan

[73] Assignee: Olympus Optical Co. Ltd., Tokyo, Japan

[21] Appl. No.: 944,975

[22] Filed: Sep. 22, 1978

[30] Foreign Application Priority Data

Sep. 30, 1977 [JP] Japan ................. 52-117559

[51] Int. Cl.² .............................................. G06M 3/00
[52] U.S. Cl. ........................................ 360/137; 346/20
[58] Field of Search ........................ 360/137; 346/20; 58/152 R, 145 R; 340/309.4 R

[56] References Cited

U.S. PATENT DOCUMENTS

| | | | |
|---|---|---|---|
| 3,120,652 | 2/1964 | Weighton | 58/145 R |
| 3,390,395 | 6/1968 | Gamburd | 58/145 R |
| 3,573,360 | 4/1971 | Rose | 346/20 |
| 3,604,624 | 9/1971 | Miura | 360/137 |
| 4,098,069 | 7/1978 | Kobayashi | 58/152 R |
| 4,122,498 | 10/1978 | Dyer | 346/20 |
| 4,140,896 | 2/1979 | Robertson | 360/137 |

Primary Examiner—John H. Wolff

[57] ABSTRACT

A tape recorder with means for displaying a time by normal and stopwatch modes is provided with a time signal generator, a first time data generator coupled with the time signal generator to produce first time data of normal mode, and a second time data generator coupled with the time signal generator to produce second time data of stopwatch mode. The tape recorder is further provided with a decoder to which the first and second time data are selectively applied and which converts the time data into time data for display, and a display unit for displaying the output of the decoder. A first switch actuated when the tape recorder operates in record and play modes and a second switch for changing a normal mode time display over to a stopwatch mode time display and vice versa are further included in the tape recorder. When the second switch is turned to the normal mode time display, the normal mode time data is displayed by the display unit regardless of the actuation of the first switch. When the second switch is turned to the stopwatch mode time display, the second time data generator is cleared and generates a second time data elapsed from the time point that the first switch is actuated. The second time data generated is displayed by the display unit.

3 Claims, 2 Drawing Figures

TAPE RECORDER WITH MEANS FOR DISPLAYING A TIME BY NORMAL AND STOPWATCH MODES

BACKGROUND OF THE INVENTION

The invention relates to a tape recorder with time display function.

It is a common practice that the time elapsed of recording or play is obtained from the counts by a counter for counting the rotational number of the reel of a tape recorder. This method, however, fails to correctly know the time elapsed. Recently, some of the tape recorders have been provided with means for displaying the time in normal mode i.e. the time to be indicated by a timepiece is defined as the time of normal mode. This time display means does not indicate the time elapsed from the starting of record or play. In other words, the time difference between the starting and end time points of record or play must be calculated from the starting time and end time of the record or play operation. This is inconvenient in practical use. For example, a small type tape recorder is frequently used at a meeting. In such a case, it is desirable that the time display unit displays time in a usual manner, or normal mode, and also in stopwatch mode i.e. an elapsed time between a starting time and a stopping time is defined as the time of stopwatch mode. In stopwatch mode, the elapsing time of record or play is displayed. This desire may easily be satified if two time display units are provided; one for the normal mode time display the other for the stopwatch mode time display. Such a time display unit, however, is costly and needs much space for accommodating two display units. This is problematic particularly for small type tape recorders such as a microcassette type tape recorder.

Accordingly, an object of the invention is to provide a tape recorder in which both the time displays of normal and stopwatch modes are possible by using a single time display unit.

SUMMARY OF THE INVENTION

To achieve the object, the invention provides a tape recorder with means for displaying a time by normal and stopwatch modes comprising: a tape recorder body; a display control switch group which is provided on the tape recorder body and includes a first switch actuated when the tape recorder is operated in record and play modes and a second switch for changing a normal mode time display over to a stopwatch mode time display and vice versa; time signal generating means; first time data generating means which is coupled with the time signal generating means and produces first time data of normal mode; second time data generating means which is coupled with the time signal generating means and produces second time data of stopwatch mode; decoding means which selectively receives the first and second time data and decodes the data received into display time data; a time display unit for displaying the output of the decoding means; a first control circuit in which, when the second switch is turned to the normal mode time display side, the first time data is supplied to the decoding means and the normal mode time data is displayed by the time display unit; a second control circuit which, when the second switch is turned to the stopwatch mode time display, resets the second time data generating means; and a third control circuit in which, when the first switch is operated in a state that the second switch remains turned to the stopwatch mode time display, the second time data is supplied to the decoding means and the time elapsed from the time point when the first switch is operated is displayed by the display unit.

Other objects and features of the invention will be apparent from the following description taken in connection with the accompanying drawings, in which:

DETAILED DESCRIPTION OF THE PREFERRED EMBODIMENT

Figure 1:
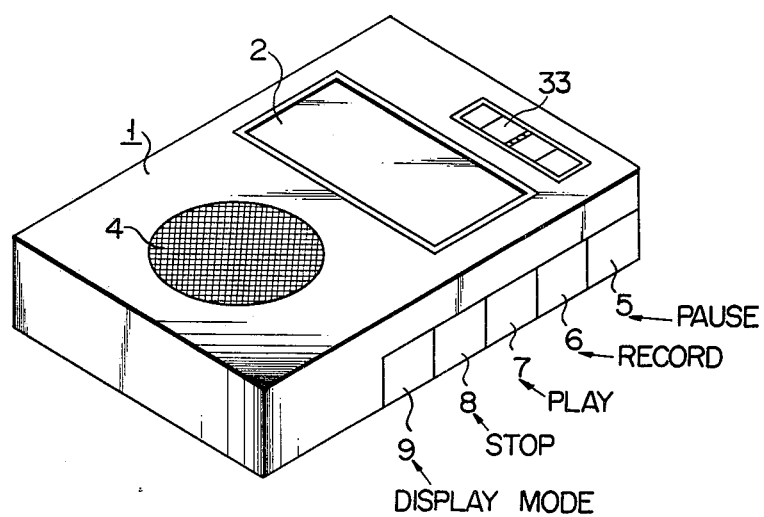
FIG. 1 shows a perspective view of a tape recorder according to the invention.

As shown in FIG. 1, a microcassette holder 2, a time display unit 33 and a speaker 4 are formed on the upper surface of a tape recorder body 1. The tape recorder body 1 is further provided at a side with a series of switches such as a pause switch 5, a record switch 6, a play switch 7, a stopwatch 8, and a display mode changeover switch 9. In those switches, switches 5, 6, 7 and 9 are of push-button type. These button switches, when depressed, are locked and the locking state of them is released when the stop switch 8 is depressed.

Figure 2:
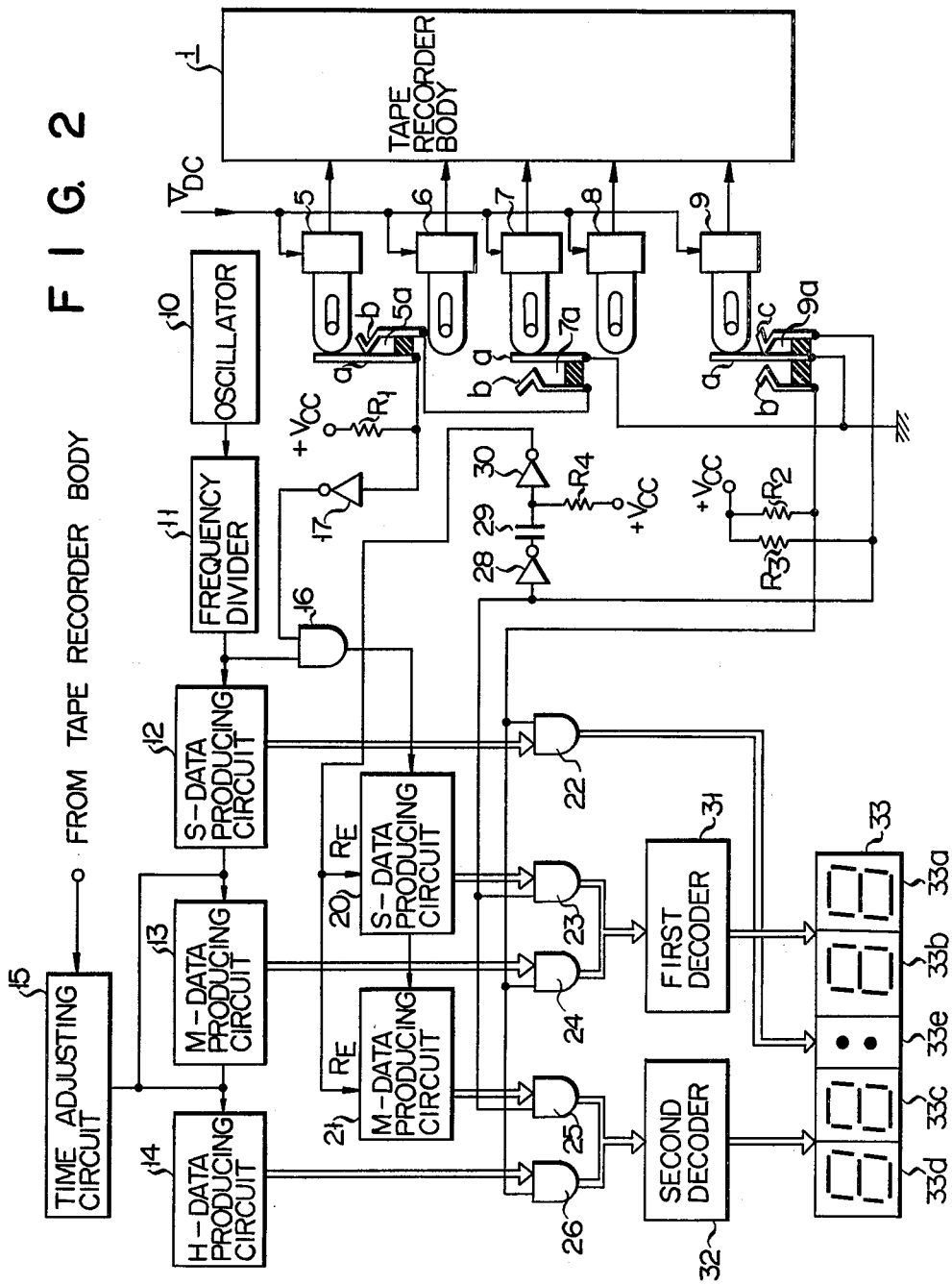
FIG. 2 shows a circuit diagram of a time display section of the tape recorder shown in FIG. 1.

Turning now to FIG. 2, there is shown a circuit diagram of a time display section of the invention. Although the circuit is practically housed in the tape recorder body 1, FIG. 2 depicts it as if it were formed on the outside of the tape recorder body 1 for easy of explanation. The signals generated when the switches 5 to 9 are actuated are directed to necessary portions in the tape recorder body 1. An oscillator 10 and a frequency divider 11 for frequency-dividing the output signal from the oscillator 10 cooperate to form a time signal generating circuit. The output signal from the frequency-divider 11 is applied to a "second" data generating circuit 12. The "second" data generating circuit forms a "minute" signal and supplies it, each time that it is produced, to a "minute" data generating circuit 13. The "minute" data generating circuit 13 forms an "hour" signal and supplies it to an "hour" data generating circuit 14, each time that the "hour" signal is formed. These circuits 12 to 14 cooperate to form a first time data generating circuit for generating first time data of normal mode. A time adjusting circuit 15, when a time adjusting button (not shown) provided on the body 1 is depressed, receives a given time adjusting pulse and produces an output signal toward the "minute" data generating circuit 13 and "hour" data generating circuit 14. The normal mode time data generating circuit and the time adjusting circuit are the same as those in a useful electronic watch. Therefore, further detailed explanation of them will be omitted.

A first switch 7a is of normally open type and its lever a and a contact b are closed when the play switch 7 (which is depressed even in recording mode, together with the record switch 6, as will be described later) is depressed. A second switch 9a has a lever a, contacts b and c. When a display mode switch 9 is turned to the normal mode time display, the lever a contacts the contact c. When it is turned to the stopwatch mode time display, the lever a comes in contact with the contact b. A third switch 5a of normally close type includes a lever a and contact b. When the pause switch is depressed the lever a is separated from the contact b. A first AND gate 16 is connected at one input terminal to the output terminal of the frequency-dividing circuit 11 and at the other input terminal to the lever a of the third switch 5a by way of an inverter 17. A positive voltage +Vcc is supplied to the lever a through a resistor R1. A second time data generating circuit comprised of a "second" data generating circuit 20 and a "minute" data generating circuit 21, produces second time data of stopwatch mode. The output of the first AND gate 16 is coupled with the input terminal of the second data generating circuit. The "second" data generating circuit 12, the "minute" data generating circuit 13, and the "hour" data generating circuit 14 in the first time data generating circuit are coupled with the first input terminals of second, fourth and sixth AND gates 22, 24 and 26, respectively. The second input terminals of them are commonly connected to the contact b of the second switch 9a, to which a positive voltage +Vcc is applied through a resistor R2. The first terminals of third and fifth AND gates 23 and 25 are coupled with the "second" data generating circuit 20 and the "minute" data generating circuit 21 in the second time data generating circuit for generating the second time data of stopwatch mode. The second input terminals of the AND gates 23 and 25 are coupled with the contact c of the second switch 9a. The contact c receives the positive voltage +Vcc applied through a resistor R3. The contact c of the second switch 9a is connected to the reset terminal $R_E$ of the "second" data generating circuit 20 through a series circuit including an inverter 28, a capacitor 29 and an inverter 30 and is further connected to the reset terminal $R_E$ of the "minute" data generating circuit 21. The positive voltage +Vcc is applied to the connecting point between the capacitor 29 and the inverter 30, through a resistor R4. The contact b of the third switch 5a and the contact b of the first switch 7a are connected to each other. The lever a of the first switch 7a and the lever a of the display mode switch 9a are commonly connected to each other. The outputs of the third and fourth AND gates 23 and 24 are commonly connected to the input of the first decoder 31 and the outputs of the fifth and sixth AND gates 25 and 26 are commonly connected to the input of the second decoder 32. The display unit 33 includes first to fourth segment display sections 33a to 33d and a "second" signal flashing unit 33e. The output of the first decoder 31 is applied to the first and second display sections 33a and 33b; the output of the second decoder 32 to the third and fourth display sections 33c and 33d; The output of the second AND gate 22 to the "second" signal flashing unit 33e.

In operation, let us consider a case where the display unit 33 displays the first data from the first time data generating circuit (12, 13 and 14). In this case, the display mode switch 9 is not depressed. Accordingly, the lever a and the contact c of the second switch 9a are in contact with each other. Accordingly, the contact b of the switch 9a is in non-grounded condition so that the second input terminals of the AND gates 22, 24 and 26 are at "H" level and the contact c of the switch 9a is grounded. Therefore, the second input terminals of the third and fifth AND gates 23 and 25 are at "L" level. Further, at this time, the lever a and the contact b of the first switch 7a are separated to each other, so that the second input terminal of the first AND gate 16 is at "L" level. The time signal from the frequency-dividing circuit 11 is not applied to the second time data generating circuit (20, 21). Under this condition, the first time data generating circuit (12, 13 and 14) continuously generates the time data of the normal mode. The "second" signal from the "second" data generating circuit 12 passes through the second AND gate 22 to reach the "second" signal flashing unit 33e. Upon receipt of the "second" signal, the unit 33e lights with one second intervals. The "minute" data from the "minute" data generating circuit 13 passes through the fourth AND gate to the decoder 31 where it is converted into a display code. The display code signal converted is then applied to the display sections 33a and 33b where a numeral representing "minute" is displayed. The "hour" data from the "hour" data generating circuit 14 is supplied to the decoder 32 through the sixth AND gate 26 where it is converted into a code representing "hour" which in turn is applied to the third and fourth display units 33c and 33d where it is displayed in terms of a numeral representing "hour." So long as the second switch 9a is held in a state as illustrated in the figure, even if the play switch 7 is depressed (as previously stated, it is depressed in the record operation) and the first AND gate 16 is enabled and the time signals from the frequency-dividing circuit 11 is applied to the "second" data generating circuit 20, the time data from the second time data generating circuit (20, 21) is not displayed by the display unit since the third and fifth AND gates are being disabled, as described previously.

The operation to follow is a case where the stopwatch mode time data from the second time data generating circuit (20, 21) is displayed by the display unit 33. In this case, the sotpwatch mode switch 9 is depressed, the lever a of the second switch 9a comes in contact with the contact b of the same. Upon the contact of them, the second input terminals of the AND gates 22, 24 and 26 becomes "L" level so that the time data in the first time data generating circuit (12, 13, 14) is not displayed by the display unit 33. Since the lever a of the switch 9a is separated from the contact c, an "H" level reset signal is applied to the reset terminals $R_E$ of the "second" data generating circuit 20 and the "minute" data generating circuit 21, through the inverter 28, the capacitor 29 and the inverter 30. Accordingly, the contents of the circuits 20 and 21 are cleared. Under this condition, when the play switch 7 is depressed (in the case of the play, only the switch 7 is depressed but in the record, the switches 6 and 7 are depressed), the lever a of the first switch 7a comes in contact with the contact b so that an "H" level signal is applied to the second input terminal of the first AND gate 16 and the AND gate 16 is enabled. Accordingly, the time signals from the frequency-dividing circuit 11 is supplied to the "second" data generating circuit 20 and therefore the second time data generating circuit (20, 21) supplies time data representing the time elapsed from the time point when the play switch 7 is depressed to the decoders 31 and 32, through third and fifth AND gates 23 and 25. Accordingly, the display unit 33 displays the time data of the stopwatch mode. When the stopswitch 8 is depressed following the record or the play operation, the rocking of the display mode switch 9 is released and the relationship between the lever a and the contacts b and c is an illustrated so that the third and fifth AND gates 23 and 25 are disabled and the second, fourth and sixth AND gates 22, 24 and 26 are enabled. Therefore, the display unit 33 displays the time data of normal mode as previously mentioned.

The explanation to be given is a case where the record or play (reproduction) is temporarily stopped.

Also in this case, the lever a of the second switch 9a is in contact with the contact b; the second, fourth and sixth AND gates 22, 24 and 26 are disabled; the third and fifth AND gates 23 and 25 are enabled. When the pause switch 5 is depressed, the lever a of the third switch 5a is separated from the contact b so that a "L" level signal is applied to the second input terminal of the AND gate 16. Accordingly, supply of the time signals from the frequency-divider 11 to the "second" data generating circuit 20 is temporarily stopped so that the contents of the second time data generating circuit (20, 21) is held as it is. To release the temporary stoppage, the pause switch 5 is depressed again and the third switch 5a is as illustrated in the drawing. The AND gate 16 is enabled again. Accordingly, the second time data generating circuit (20, 21) supplies to the decoders 31 and 32 the contents resulting from the addition of the time elaspsed after the temporary stoppage is released to the contents of the second time data generating circuit at the temporary stoppage. Accordingly, the display unit 33 displays the sum of the times after and before the temporary stoppage.

Having described a specific embodiment of the invention, it is believed obvious that modification and variation of the invention is possible in the light of the above teachings.

What we claim is:

1. A tape recorder with means for displaying a time by normal and stopwatch modes wherein the time of normal mode is defined as the time indicated by a timepiece, and the time of stopwatch mode is defined as the time elapsed between a starting time and a stopping time, said tape recorder comprising:
    a tape recorder body;
    a display control switch group which is provided on said tape recorder body and includes a first switch actuated when said tape recorder is operated in record and play modes and a second switch for changing a normal mode time display over to a stopwatch mode time display and vise versa;
    time signal generating means;
    first time data generating means which is coupled with said time signal generating means and produces first time data of normal mode;
    second time data generating means which is coupled with said time signal generating means and produces second time data of stopwatch mode;
    decoding means which selectively receives said first and second time data and decodes the date received into display time data;
    a time display unit for displaying the output of said decoding means;
    a first control circuit in which, when said second switch is turned to the normal mode time display side, said first time data is supplied to said decoding means and said normal mode time data is displayed by said time display unit;
    a second control circuit which, when said second switch is turned to the stopwatch mode time display, resets said second time data generating means; and
    a third control circuit in which, when said first switch is operated in a state that said second switch remains turned to the stopwatch mode time display, said second time data is supplied to said decoding means and the time elapsed from the time point when said first switch is operated is displayed by said display unit.

2. A tape recorder according to claim 1, in which said display control switch group further includes a third switch which is actuated interlocking with a switch for temporarily stopping the record and play, said third switch being coupled with a fourth control circuit to stop the supply of the time signals from said time signal generating means to said second time data generating circuit when said third switch is actuated.

3. A tape recorder according to claim 1, in which said display unit includes first to fourth display sections and, when said first time data is displayed, "minute" data of said first time data is displayed on said first and second display sections and "hour" data is displayed on said third to fourth display sections and "second" data of said first time data is flashed between said second and third display sections; and when said second time data is displayed, the "second" data is displayed on said first and second display sections and the "minute" data of said second time data is displayed on said third and fourth display sections.

* * * * *